United States Patent
Park et al.

(10) Patent No.: US 11,505,078 B2
(45) Date of Patent: Nov. 22, 2022

(54) APPARATUS AND METHOD FOR CONTROLLING OPTIMIZATION OF CHARGING AMOUNT OF BATTERY FOR VEHICLE

(71) Applicants: HYUNDAI MOTOR COMPANY, Seoul (KR); KIA MOTORS CORPORATION, Seoul (KR)

(72) Inventors: Dae Ro Park, Hwaseong-si (KR); Ho Won Seo, Gwacheon-si (KR); Tae Hyuck Kim, Seoul (KR); Ji Yeol Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 296 days.

(21) Appl. No.: 16/783,285

(22) Filed: Feb. 6, 2020

(65) Prior Publication Data
US 2021/0061120 A1     Mar. 4, 2021

(30) Foreign Application Priority Data
Aug. 30, 2019   (KR) .................... 10-2019-0107115

(51) Int. Cl.
*B60L 53/62*        (2019.01)
*H02J 7/00*         (2006.01)
(Continued)

(52) U.S. Cl.
CPC ............... *B60L 53/62* (2019.02); *B60K 6/24* (2013.01); *B60K 6/28* (2013.01); *B60L 7/10* (2013.01);
(Continued)

(58) Field of Classification Search
CPC .. B60L 53/62; B60L 58/13; B60L 7/10; H02J 7/007; H02J 7/0048; H02J 7/00;
(Continued)

(56) References Cited

U.S. PATENT DOCUMENTS

2012/0053771 A1*  3/2012  Yoshida .................. B60L 55/00
                                                              701/22
2013/0041538 A1*  2/2013  Jin ......................... B60L 50/16
                                                              701/22

(Continued)

FOREIGN PATENT DOCUMENTS

JP        2012247254 A  * 12/2012

*Primary Examiner* — Drew A Dunn
*Assistant Examiner* — Dung V Bui
(74) *Attorney, Agent, or Firm* — Lempia Summerfield Katz LLC

(57) ABSTRACT

An apparatus for controlling optimization of a charging amount of a battery for a vehicle charged with external power includes: a map storage, a position detector, and a controller to control the map storage and the position detector. The controller acquires a current position of the vehicle when a driver's desired charging setting value is input, acquires altitude information of topography corresponding to a driving path, calculates a gain charging amount in an uphill or downhill section on the driving path based on the altitude information, calculates an optimum charging setting value based on the driver's desired charging setting value and the gain charging amount, calculates a final target charging amount based on the optimum charging setting value and a current residual charging amount, and performs optimum charging of the battery.

20 Claims, 7 Drawing Sheets

(51) Int. Cl.
  *B60L 58/13* (2019.01)
  *B60K 6/28* (2007.10)
  *B60K 6/24* (2007.10)
  *B60L 7/10* (2006.01)
  *G07C 5/08* (2006.01)
  *B60W 20/00* (2016.01)

(52) U.S. Cl.
  CPC ............ *B60L 58/13* (2019.02); *G07C 5/0825* (2013.01); *H02J 7/007* (2013.01); *H02J 7/0048* (2020.01); *B60W 20/00* (2013.01); *B60W 2555/40* (2020.02); *B60Y 2200/92* (2013.01); *B60Y 2300/91* (2013.01)

(58) Field of Classification Search
  CPC .. B60K 6/28; B60K 6/24; G07C 5/08; B60W 2555/40; B60W 20/00; B60Y 2200/92; B60Y 2300/91
  USPC ........................................................ 320/109
  See application file for complete search history.

(56) References Cited

U.S. PATENT DOCUMENTS

| | | | |
|---|---|---|---|
| 2017/0120761 A1* | 5/2017 | Kapadia | B60L 58/12 |
| 2018/0334157 A1* | 11/2018 | Tanaka | B60K 6/20 |
| 2019/0061552 A1* | 2/2019 | Amari | B60L 53/10 |
| 2019/0178678 A1* | 6/2019 | Rah | B60L 58/12 |
| 2019/0217716 A1* | 7/2019 | Yang | B60L 53/60 |
| 2019/0217718 A1* | 7/2019 | Arregui Torres | B60L 53/11 |

* cited by examiner

APPARATUS AND METHOD FOR CONTROLLING OPTIMIZATION OF CHARGING AMOUNT OF BATTERY FOR VEHICLE

CROSS-REFERENCE TO RELATED APPLICATION

This application claims priority to and the benefit of Korean Patent Application No. 10-2019-0107115, filed on Aug. 30, 2019, the entire contents of which are hereby incorporated by reference.

FIELD

The present disclosure relates to an apparatus for controlling optimization of a charging amount of a battery for a vehicle.

BACKGROUND

The statements in this section merely provide background information related to the present disclosure and may not constitute prior art.

Recently, to improve global environment, hybrid electric vehicles (HEVs), electric vehicles (EVs), fuel cell vehicles (FCVs), etc. have been developed, and particularly, it is expected that development of electric vehicles will stand out in the future.

In these electric vehicles, regenerative braking technology may be used to improve fuel efficiency.

In case of regenerative braking, when a vehicle is braked, a part of braking force may be used to generate electric energy, a battery may be charged with the generated electric energy, and a part of kinetic energy due to a driving speed of the vehicle may be used as energy desired to drive a generator.

However, if the state of charge (SOC) of the battery of the electric vehicle is a fully charged state, charging of the battery may be restricted due to regenerative braking.

We have discovered that, in a high-altitude area, when the electric vehicle enters a downhill road section before and after the SOC of the battery of the electric vehicle becomes the fully charged state, it is difficult to charge the battery, and thus, energy loss may occur.

Further, in the high-altitude area, when the electric vehicle is driven on a downhill road, it is difficult to perform cruise control.

That is, a hybrid electric vehicle may maximally perform cruise control using drag force using a motor, but when the state of charge (SOC) of a battery of the hybrid electric vehicle is the fully charged state, it is difficult to perform cruise control.

Further, in the hybrid electric vehicle, even if a charging necessity alarm lamp is turned on during driving on an uphill road, when the hybrid electric vehicle enters a downhill road, the charging necessity alarm lamp may be turned off.

The reason for this is that charging of the battery is performed due to regenerative braking.

However, if the charging necessity alarm lamp is turned on or off according to topology, marketability and reliability of the vehicle may be undermined.

SUMMARY

The present disclosure is directed to an apparatus and method for controlling optimization of a charging amount of a battery for a vehicle.

The present disclosure provides an apparatus and method for controlling optimization of a charging amount of a battery of a vehicle charged with external power, which may set an optimum charging amount and an optimum charging alarm by predicting the topography of a driving path.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

In one form of the present disclosure, an apparatus for controlling optimization of a charging amount of a battery of a vehicle charged with external power includes: a map storage configured to store altitude information of topography, a position detector configured to detect a current position of the vehicle, and a controller configured to control the map storage and the position detector. I particular, the controller acquires a current position of the vehicle from the position detector when a driver's desired charging setting value is input, acquires altitude information of topography corresponding to a driving path between the current position of the vehicle and a destination, calculates a gain charging amount in an uphill or downhill section on the driving path based on the altitude information, calculates an optimum charging setting value based on the driver's desired charging setting value and the calculated gain charging amount, calculates a final target charging amount based on the optimum charging setting value and a current residual charging amount, and thus controls charging of the battery so as to perform optimum charging of the battery.

In another aspect of the present disclosure, a method for controlling optimization of a charging amount of a battery in an apparatus for controlling optimization of the charging amount of the battery of a vehicle charged with external power, the apparatus having a controller configured to control a position detector, includes: acquiring, by the controller, a current position of the vehicle when a driver's desired charging setting value is input, confirming, by the controller, whether or not the current position of the vehicle is located in a high-altitude area based on the current position of the vehicle, requesting, by the controller, input of a destination when the current position of the vehicle is located in the high-altitude area, confirming, by the controller, whether or not the destination is input as requested, acquiring, by the controller, altitude information of topography corresponding to a driving path between the current position of the vehicle and the destination when the destination is input, calculating, by the controller, a gain charging amount in an uphill or downhill section between the current position of the vehicle and the destination based on the altitude information, calculating, by the controller, an optimum charging setting value based on the driver's desired charging setting value and the gain charging amount, calculating, by the controller, a final target charging amount based on the optimum charging setting value and a current residual charging amount, and controlling, by the controller, charging of the battery so as to perform optimum charging of the battery based on the final target charging amount.

The method may further include, after the controlling the charging of the battery, confirming, by the controller, whether or not a state of charge (SOC) of the battery is less than a charging alarm display reference value when the SOC is a discharged state, calculating, by the controller, a gain charging amount in the uphill or downhill section between the current position of the vehicle and the destination when the SOC is less than the charging alarm display reference value, calculating, by the controller, a corrected SOC based on the gain charging amount, confirming, by the controller, whether or not the corrected SOC is less than the charging alarm display reference value, and turning on, by the controller, a charging alarm lamp when the corrected SOC is less than the charging alarm display reference value.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6:
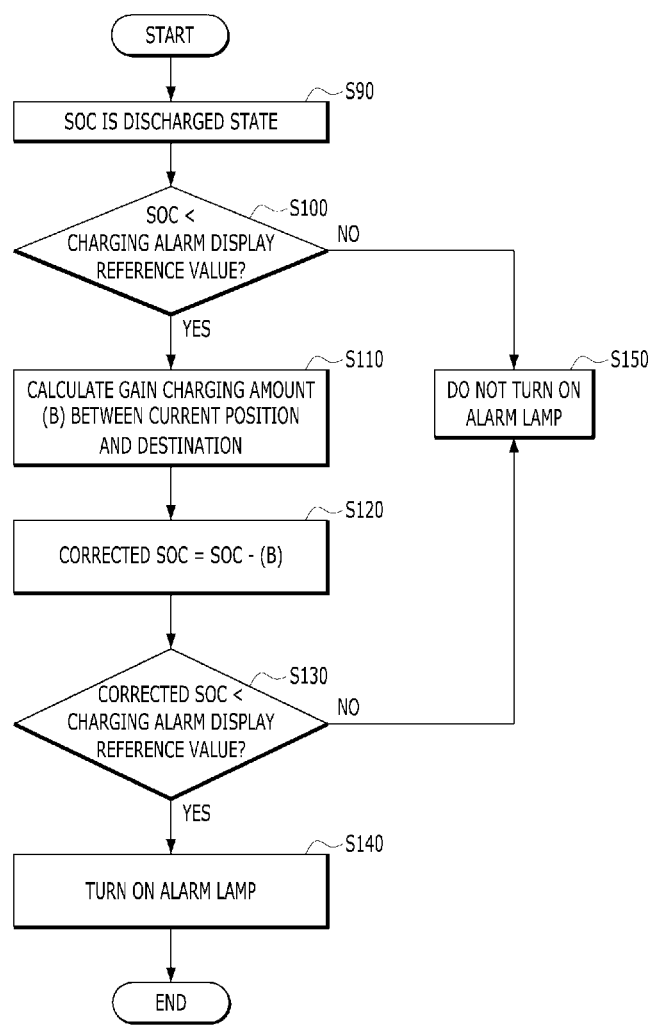
Figure 7:
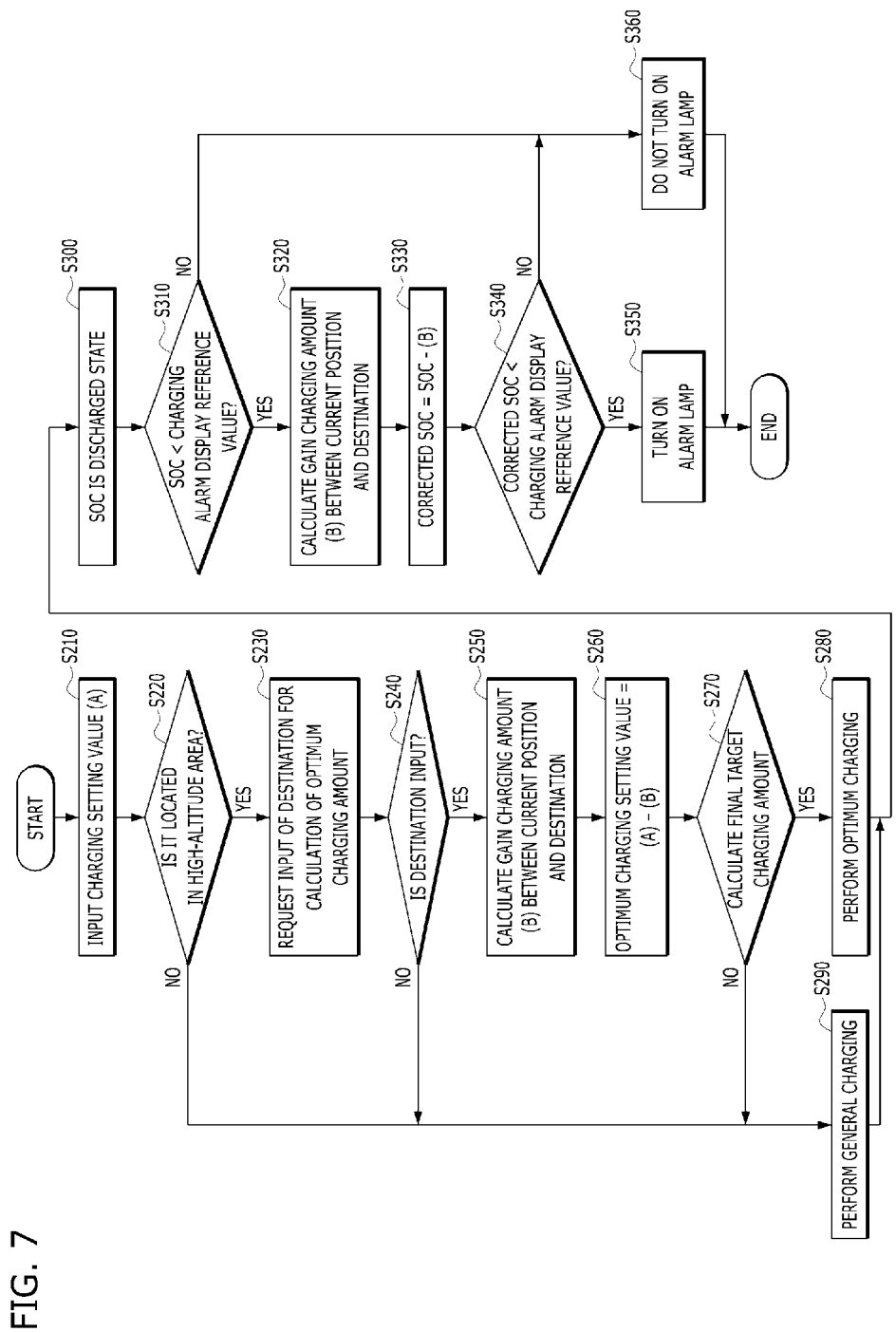

FIG. 6 is a flowchart illustrating a method for setting an optimum charging alarm in the apparatus for controlling optimization of the charging amount of the battery of the vehicle charged with external power; and FIG. 7 is a flowchart illustrating a method for controlling optimization of a charging amount in an apparatus for controlling optimization of a charging amount of a battery of a vehicle charged with external power.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, which are illustrated in the accompanying drawings. However, the disclosure of the present disclosure is not limited to the forms set forth herein, and may be variously modified. In the drawings, in order to clearly describe the present disclosure, descriptions of elements which are not related to the present disclosure will be omitted, and the same or similar elements are denoted by the same reference numerals even when they are depicted in different drawings.

In the following description of the forms, it will be understood that, when a part "includes" an element, the part may further include other elements and does not exclude presence of the elements, unless stated otherwise. Further, in the following description of the forms, it will be understood that a suffix "part", "unit" or "module" means a unit to process at least one function or operation, and it may be implemented by hardware, software, or a combination of hardware and software.

Hereinafter, with reference to FIGS. 1 to 7, an apparatus and method for controlling optimization of a charging amount of a battery of a vehicle charged with external power, to which forms of the present disclosure is applicable, will be described in detail.

Figure 1:
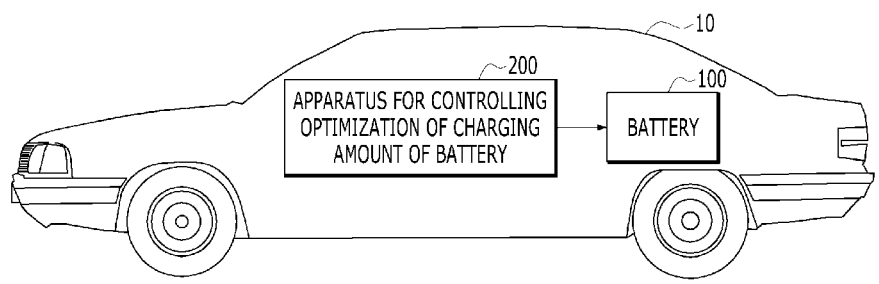
FIG. 1 is a view illustrating a vehicle including an apparatus for controlling optimization of a charging amount of a battery.

FIG. 1 is a view illustrating a vehicle including an apparatus for controlling optimization of a charging amount of a battery in accordance with one form of the present disclosure.

As shown in FIG. 1, a vehicle 10 may include a battery 100 which is charged with electrical energy, and an apparatus 200 for controlling optimization of the charging amount of the battery 100 which optimizes setting of the charging amount of the battery 100 and setting of a charging alarm of the battery 100 by predicting uphill driving or downhill driving.

Here, the apparatus 200 may acquire a current position of the vehicle 10 when a driver's desired charging setting value is input, confirm whether or not the current position of the vehicle 10 is located in a high-altitude area, request input of a destination when the current position of the vehicle 10 is located in the high-altitude area, acquire altitude information of topography corresponding to a driving path between the current position and the destination when the destination is input as requested, calculate a gain charging amount in an uphill or downhill section on the driving path based on the altitude information, calculate an optimum charging setting value based on the driver's desired charging setting value and the calculated gain charging amount, calculate a final target charging amount based on the optimum charging setting value and a current residual charging amount, and perform optimum charging of the battery 100.

Here, the apparatus 200 may perform general charging of the battery 100 when the current position of the vehicle 10 is not located in the high-altitude area or application of the optimum charging setting value is refused.

As such, the charging amount of the battery 100 is optimally set in consideration of a predetermined route, i.e., uphill or downhill driving, and thus, energy conservation and improvement in functions of the vehicle may be achieved.

Further, the apparatus 200 may confirm whether or not a state of charge (SOC) of the battery 100 is less than a charging alarm display reference value when the SOC is a discharged state, calculate a gain charging amount in the uphill or downhill section between the current position and the destination when the SOC is less than the charging alarm display reference value, calculate a corrected SOC based on the gain charging amount, confirm whether or not the corrected SOC is less than the charging alarm display reference value, and turn on a charging alarm lamp when the corrected SOC is less than the charging alarm display reference value.

Here, the apparatus 200 may not turn on the charging alarm lamp when the corrected SOC is the charging alarm display reference value or more.

In this way, a point in time when the charging alarm is displayed is optimally set in consideration of a predetermined route, i.e., uphill or downhill driving, and thus marketability of the vehicle may be improved.

The apparatus 200 may be mounted in a vehicle, calculate an optimum charging setting value by correcting a driver's desired charging setting value in the vehicle, and perform optimum charging of a battery of the vehicle with a final target charging amount corresponding to the optimum charging setting value.

In some cases, the apparatus 200 may be mounted in a charger of a vehicle, directly automatically acquire current position and path information of the vehicle or directly manually receive the current position and path information of the vehicle from a driver, calculate an optimum charging setting value of the vehicle, and perform optimum charging of a battery of the vehicle with a final target charging amount corresponding to the optimum charging setting value.

Here, when the vehicle provides SOC information corresponding a regenerative braking amount to the charger, the charger may calculate the optimum charging setting value by correcting the driver's desired charging setting value, and then calculate the final target charging amount corresponding to the optimum charging setting value.

Otherwise, when the vehicle calculates the optimum charging setting value by correcting the driver's desired charging setting value based on SOC information corresponding to a regenerative braking amount and then calculates the final target charging amount corresponding to the optimum charging setting value, the vehicle may transmit the final target charging amount to the charger.

Figure 2:
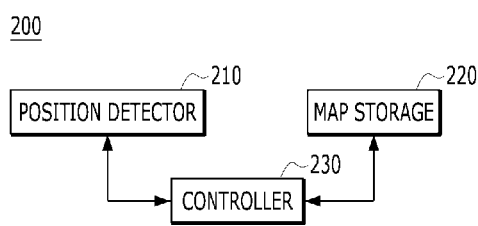
FIG. 2 is a block diagram illustrating the apparatus for controlling optimization of the charging amount of the battery of the vehicle charged with external power.

FIG. 2 is a block diagram illustrating the apparatus for controlling optimization of the charging amount of the battery of the vehicle charged with external power in accordance with one form of the present disclosure.

As shown in FIG. 2, the apparatus 200 may include a position detector 210 which detects the current position of the vehicle, a map storage 220 which stores altitude information of topography, and a controller 230 which controls the map storage 220 and the position detector 210.

Here, the position detector 210 may detect position information of the vehicle based on a global positioning system (GPS), without being limited thereto.

Further, the controller 230 may acquire a current position of the vehicle from the position detector 210 when a driver's desired charging setting value is input, whether or not the current position of the vehicle is located in a high-altitude area, request input of a destination when the current position of the vehicle is located in the high-altitude area, acquire altitude information of topography corresponding to a driving path between the current position and the destination when the destination is input as requested, calculate a gain charging amount in an uphill or downhill section on the driving path based on the altitude information, calculate an optimum charging setting value by correcting the driver's desired charging setting value based on the calculated gain charging amount, calculate a final target charging amount based on the optimum charging setting value and a current residual charging amount, and thus perform optimum charging of the battery 100.

Here, when the driver's desired charging setting value is input, if there is a charging setting request, the controller may automatically receive a charging setting value extracted from charging setting values which are stored in advance.

In a case, when the driver's desired charging setting value is input, if there is the charging setting request, the controller 230 may request input of a charging setting value, and receive the charging setting value due to user input.

In another case, when the driver's desired charging setting value is input, if there is a battery charging request, the controller 230 may automatically receive a charging setting value extracted from charging setting values which are stored in advance.

In yet another case, when the driver's desired charging setting value is input, if there is the battery charging request, the controller 230 may request input of a charging setting value, and receive the charging setting value due to user input.

Further, when the controller 230 confirms the current position of the vehicle, the controller 230 may control charging of the battery 100 so as to perform general charging, if the current position of the vehicle is not located in the high-altitude area.

Thereafter, when the controller 230 requests input of the destination, the controller 230 may control charging of the battery 100 so as to perform general charging, if the destination is not input within a predetermined time.

Thereafter, when the controller 230 calculates the gain charging amount in the uphill or downhill section on the driving path between the current position and the destination, the controller 230 may extract the uphill or downhill section on the driving path based on the altitude information, and calculate the gain charging amount based on the altitude and slope of the extracted uphill or downhill section.

As one example, when the controller 230 calculates the gain charging amount in the uphill section, the controller 230 may calculate the gain charging amount in the uphill section by calculating a non-consumption amount of the SOC due to starting of an engine caused by transition of the vehicle to an HEV mode.

As another example, when the controller 230 calculates the gain charging amount in the downhill section, the controller 230 may calculate the gain charging amount in the downhill section by calculating an expected average vehicle speed corresponding to the altitude and slope of the downhill section and an amount of energy generated due to regenerative braking thereby.

Further, when the controller 230 calculates the optimum charging setting value, the controller 230 may calculate the optimum charging setting value using an equation of Optimum charging Setting Value=Driver's Desired Charging Setting Value−Gain Charging Amount in Uphill or Downhill section.

Also, when the controller 230 calculates the final target charging amount, the controller 230 may calculate the final target charging amount using an equation of Final Target Charging Amount=Optimum charging Setting Value−Current Residual Charging Amount.

Further, when the controller 230 calculates the optimum charging setting value, the controller 230 may confirm whether or not application of the optimum charging setting value is requested, calculate the final target charging amount by applying the optimum charging setting value upon confirming that application of the optimum charging setting value is requested, and control charging of the battery 100 so as to perform optimum charging based on the final target charging amount.

In some cases, upon confirming that application of the optimum charging setting value is requested, the controller

230 may update the driver's desired final setting value, which is stored in advance, with the optimum charging setting value.

Thereafter, when application of the optimum charging setting value is refused, the controller 230 may control charging of the battery 100 so as to perform general charging.

Thereafter, the controller 230 may confirm whether or not the SOC of the battery 100 is less than a charging alarm display reference value when the SOC of the battery is a discharged state, calculate a gain charging amount in the uphill or downhill section between the current position and the destination when the SOC is less than the charging alarm display reference value, calculate a corrected SOC based on the gain charging amount, confirm whether or not the corrected SOC is less than the charging alarm display reference value, and turn on a charging alarm lamp when the corrected SOC is less than the charging alarm display reference value.

Here, when the controller 230 confirms whether or not the SOC of the battery 100 is less than the charging alarm display reference value, the controller 230 may not turn on the charging alarm lamp if the corrected SOC is the charging alarm display reference value or more.

Further, when the controller 230 calculates the gain charging amount in the uphill or downhill section between the current position and the destination, the controller 230 may extract the uphill or downhill section on the driving path based on the altitude information, and calculate the gain charging amount based on the altitude and slope of the extracted uphill or downhill section.

As one example, when the controller 230 calculates the gain charging amount in the uphill section, the controller 230 may calculate the gain charging amount in the uphill section by calculating a non-consumption amount of the SOC due to starting of the engine caused by transition of the vehicle to the HEV mode.

As another example, when the controller 230 calculates the gain charging amount in the downhill section, the controller 230 may calculate the gain charging amount in the downhill section by calculating an expected average vehicle speed corresponding to the altitude and slope of the downhill section and an amount of energy generated due to regenerative braking thereby.

Further, when the controller 230 calculates the corrected SOC, the controller 230 may calculate the corrected SOC using an equation of Corrected SOC=SOC−Gain Charging Amount in Uphill or Downhill section.

In addition, when the controller 230 confirms whether or not the corrected SOC is less than the charging alarm display reference value, the controller 230 may not turn on the charging alarm lamp if the corrected SOC is the charging alarm display reference value or more.

In this way, an optimum charging amount and an optimum charging alarm of the battery 100 can be set by predicting the topography of the driving path, such as an uphill or downhill driving section.

That is, the optimum charging amount of the battery 100 may be set in consideration of a predetermined route, i.e., uphill or downhill driving, thus achieving energy conservation and improvement in functions of the vehicle.

Further, an optimum point in time when the charging alarm is displayed may be set in consideration of the predetermined route, i.e., uphill or downhill driving, thus improving marketability of the vehicle.

Figure 3:
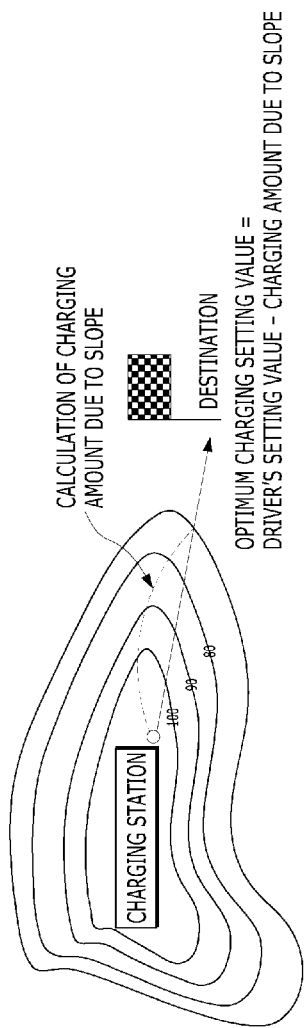
FIG. 3 is a view illustrating a process for setting an optimum charging amount in consideration of uphill or downhill driving.

FIG. 3 is a view illustrating a process for setting the optimum charging amount in consideration of uphill or downhill driving in one form of the present disclosure.

As shown in FIG. 3, if the vehicle 10 performs charging of the battery 100 in a charging station located in a high-altitude area, it is desired to optimize setting of a charging amount of the battery 100 in consideration of an uphill or downhill driving section from now on.

Therefore, in one form of the present disclosure, an uphill or downhill section between a current position of the vehicle and a destination may be extracted based on map information, and a gain charging amount may be calculated based on an altitude and slope of the extracted uphill section or downhill section.

As one example, when the controller 230 calculates the gain charging amount in the uphill section, the controller 230 may calculate the gain charging amount in the uphill section by calculating a non-consumption amount of the SOC due to starting of the engine caused by transition of the vehicle to the HEV mode.

As another example, when the controller 230 calculates the gain charging amount in the downhill section, the controller 230 may calculate the gain charging amount in the downhill section by calculating an expected average vehicle speed corresponding to the altitude and slope of the downhill section and an amount of energy generated due to regenerative braking thereby.

Further, in another form, an initial driver's desired charging setting value may be corrected by calculating the optimum charging setting value using an equation of Optimum charging Setting Value=Driver's Desired Charging Setting Value−Gain Charging Amount in Uphill or Downhill Section according to Altitude and Slope, and optimum charging may be performed based on a final target charging amount calculated using an equation of Final Target Charging Amount=Optimum charging Setting Value−Current Residual Charging Amount.

For example, when the driver's desired charging setting value which a driver desires is an SOC of 90% and the gain charging amount in the uphill or downhill section on the driving path between the current position of the vehicle and the destination is an SOC of 10%, the driver's desired charging setting value which is the SOC of 90% may be corrected to the optimum charging setting value which is the SOC of 80% (the driver's desired charging setting value which is the SOC of 90%—the gain charging amount which is the SOC of 10%).

Further, when the current residual charging amount is an SOC of 50%, the final target charging amount which is applied to the battery may be an SOC of 30% (the optimum charging setting value which is the SOC of 80%—the current residual charging amount which is the SOC of 50%).

Therefore, even if the driver's desired charging setting value is the SOC of 90%, optimum charging of the battery may be performed with the final target charging amount which is the SOC of 30% in consideration of the gain charging amount in the uphill or downhill section on the driving path.

As such, the optimum charging amount of the battery is set in consideration of map information, and thus, energy conservation and improvement in functions of the vehicle may be achieved.

Figure 4:
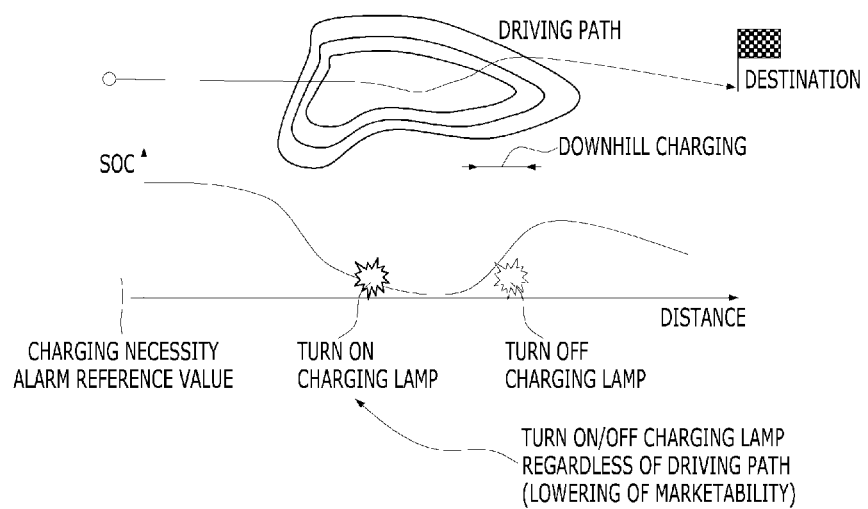
FIG. 4 is a view illustrating a process for setting an optimum charging alarm in consideration of uphill or downhill driving.

FIG. 4 is a view illustrating a process for setting the optimum charging alarm in consideration of uphill or downhill driving.

As shown in FIG. 4, in one form of the present disclosure, if the SOC of the battery is a discharged state, a gain charging amount in the uphill or downhill section between the current position of the vehicle and the destination may be calculated when the current SOC is less than a charging alarm display reference value, a corrected SOC may be calculated based on the gain charging amount, whether or not the corrected SOC is less than the charging alarm display reference value may be confirmed, a charging alarm lamp may be turned on when the corrected SOC is less than the charging alarm display reference value, and the charging alarm lamp may not be turned on when the corrected SOC is the charging alarm display reference value or more.

Here, the corrected SOC may be calculated using an equation of Corrected SOC=SOC−Gain Charging Amount in Uphill or Downhill section.

A process for calculating the gain charging amount in the uphill section or the downhill section is the same as in the description of FIG. 3, and a detailed description thereof will thus be omitted.

Therefore, a point in time when the charging alarm is displayed may be reset in consideration of uphill or downhill driving of the vehicle, and thus marketability of the vehicle may be improved.

If the uphill or downhill driving of the vehicle is not considered, the charging alarm lamp is turned on due to discharging of the battery and is then turned off due to charging of the battery caused by regenerative braking during downhill driving of the vehicle in a high-altitude area, and thus reliability in display of the charging alarm and marketability of the vehicle may be lowered.

Figure 5:
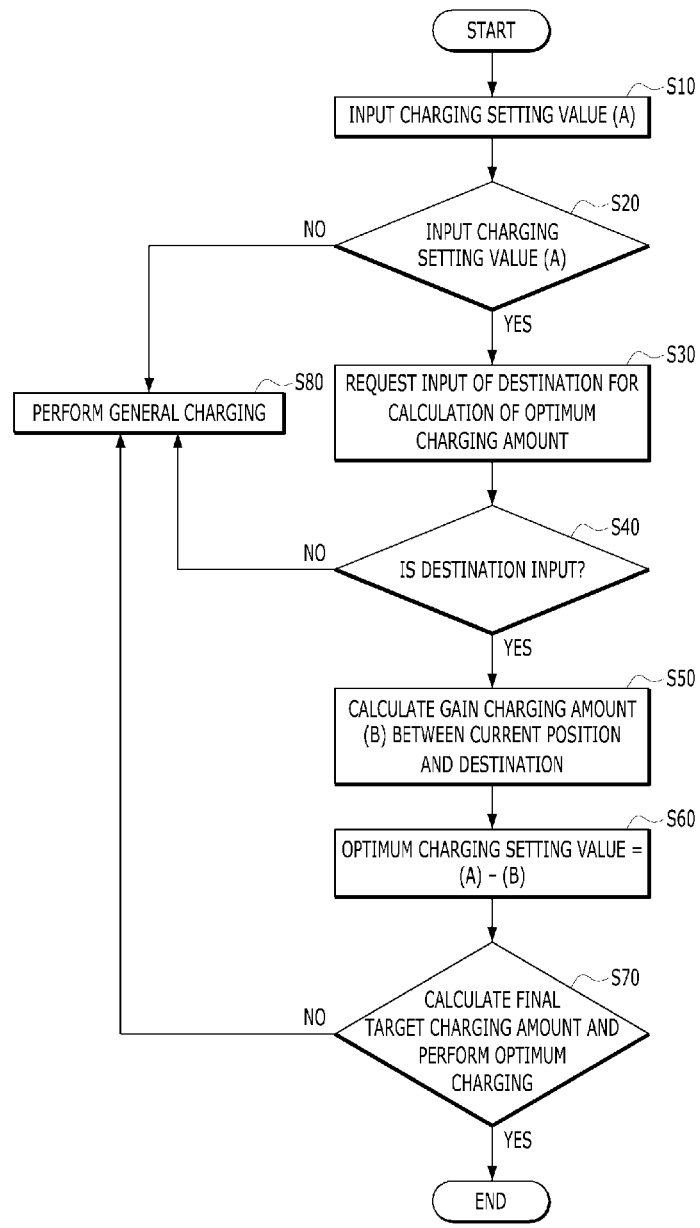
FIG. 5 is a flowchart illustrating a method for setting an optimum charging amount in the apparatus for controlling optimization of the charging amount of the battery of the vehicle charged with external power.

FIG. 5 is a flowchart illustrating a method for setting an optimum charging amount in the apparatus for controlling optimization of the charging amount of the battery of the vehicle charged with external power in accordance with one form of the present disclosure.

As shown in FIG. 5, an input of a charging setting value may be confirmed (operation S10).

For example, when there is a charging setting request, a charging setting value may be automatically extracted from charging setting values which are stored in advance, and be received.

In a case when there is the charging setting request, an input of a charging setting value may be requested, and then the charging setting value may be received due to user input.

In another form, when there is a battery charging request, a charging setting value may be automatically extracted from charging setting values which are stored in advance, and be received.

In yet another form, when there is the battery charging request, an input of a charging setting value may be requested, and then the charging setting value may be received due to user input.

Thereafter, when the charging setting value is input, position information of the vehicle may be acquired, and whether or not the current position of the vehicle is located in a high-altitude area may be confirmed based on the acquired position information (operation S20).

Thereafter, when the current position of the vehicle is located in the high-altitude area, input of a destination may be requested (operation S30).

In other form, when the current position of the vehicle is not located in the high-altitude area, general charging may be performed (operation S80).

Thereafter, whether or not the destination is input as requested may be confirmed (operation S40).

When the destination is not input within a predetermined time, general charging may be performed (operation S80).

Thereafter, in the present disclosure, when the destination is input, altitude information of topography corresponding to a driving path between the current position and the destination may be acquired, and a gain charging amount in an uphill or downhill section between the current position of the vehicle and the destination may be calculated based on the altitude information (operation S50).

Here, the uphill or downhill section between the current position and the destination may be extracted, and the gain charging amount may be calculated based on an altitude and slope of the extracted uphill section or downhill section.

As one example, in the present disclosure, when the gain charging amount in the uphill section is calculated, the gain charging amount in the uphill section may be calculated by calculating a non-consumption amount of the SOC due to starting of the engine caused by transition of the vehicle to the HEV mode.

As another example, when the gain charging amount in the downhill section is calculated, the gain charging amount in the downhill section may be calculated by calculating an expected average vehicle speed corresponding to the altitude and slope of the downhill section and an amount of energy generated due to regenerative braking thereby.

Thereafter, in one form of the present disclosure, an optimum charging setting value may be calculated by correcting the driver's desired charging setting value based on the gain charging amount (operation S60).

Here, the optimum charging setting value may be calculated using an equation of Optimum charging Setting Value=Driver's Desired Charging Setting Value−Gain Charging Amount in Uphill or Downhill Section.

Thereafter, in the present disclosure, a final target charging amount may be calculated based on the optimum charging setting value and a current residual charging amount, and optimum charging may be performed based on the final target charging amount (operation S70).

Here, the final target charging amount may be calculated using an equation of Final Target Charging Amount=Optimum charging Setting Value−Current Residual Charging Amount.

In some cases, in the present disclosure, when the optimum charging setting value is calculated, whether or not application of the optimum charging setting value is requested may be confirmed, the final target charging amount may be calculated by applying the optimum charging setting value upon confirming that application of the optimum charging setting value is requested, and charging of the battery may be controlled so that optimum charging of the battery may be performed based on the final target charging amount.

Further, in some cases, in the present disclosure, upon confirming that application of the optimum charging setting value is requested, the charging setting value which is stored may be updated with the optimum charging setting value.

Thereafter, when application of the optimum charging setting value is refused, general charging may be performed (operation S80).

In this way, in the present disclosure, the optimum charging amount of the battery may be set in consideration of a predetermined route, i.e., uphill or downhill driving, and thus energy conservation and improvement in functions of the vehicle may be achieved.

FIG. 6 is a flowchart illustrating a method for setting an optimum charging alarm in the apparatus for controlling optimization of the charging amount of the battery of the vehicle charged with external power in accordance with one form of the present disclosure.

As shown in FIG. 6, in one form of the present disclosure, whether or not the SOC of the battery is a discharged state is confirmed (operation S90).

Thereafter, upon confirming that the SOC of the battery is the discharged state, whether or not the SOC is less than the charging alarm display reference value is confirmed (operation S100).

Thereafter, when the SOC is less than the charging alarm display reference value, a gain charging amount in an uphill or downhill section between a current position of the vehicle and a destination may be calculated (operation S110).

Here, the uphill or downhill section between the current position and the destination may be extracted, and the gain charging amount may be calculated based on an altitude and slope of the extracted uphill section or downhill section.

As one example, in the present disclosure, when the gain charging amount in the uphill section is calculated, the gain charging amount in the uphill section may be calculated by calculating a non-consumption amount of the SOC due to starting of the engine caused by transition of the vehicle to the HEV mode.

As another example, when the gain charging amount in the downhill section is calculated, the gain charging amount in the downhill section may be calculated by calculating an expected average vehicle speed corresponding to the altitude and slope of the downhill section and an amount of energy generated due to regenerative braking thereby.

Further, in the present disclosure, when the SOC is the charging alarm display reference value or more, the charging alarm lamp may not be turned on (operation S150).

Thereafter, a corrected SOC may be calculated based on the gain charging amount (operation S120).

Here, the corrected SOC may be calculated using an equation of Corrected SOC=SOC−Gain Charging Amount in Uphill or Downhill section.

Thereafter, whether or not the corrected SOC is less than the charging alarm display reference value may be confirmed (operation S130).

Here, in the present disclosure, when the corrected SOC is the charging alarm display reference value or more, the charging alarm lamp may not be turned on (operation S150).

Further, in the present disclosure, when the corrected SOC is less than the charging alarm display reference value, the charging alarm lamp may be turned on (operation S140).

In this way, in the present disclosure, an optimum point in time when the charging alarm is displayed may be set in consideration of a predetermined route, i.e., uphill or downhill driving, and thus, marketability of the vehicle may be improved.

FIG. 7 is a flowchart illustrating a method for controlling optimization of a charging amount in an apparatus for controlling optimization of a charging amount of a battery of a vehicle charged with external power in accordance with one form of the present disclosure.

As shown in FIG. 7, an input of a charging setting value may be confirmed (operation S210).

Thereafter, when the charging setting value is input, position information of the vehicle may be acquired, and whether or not the current position of the vehicle is located in a high-altitude area may be confirmed based on the acquired position information (operation S220).

Thereafter, when the current position of the vehicle is located in the high-altitude area, input of a destination may be requested (operation S230).

In another form of the present disclosure, when the current position of the vehicle is not located in the high-altitude area, general charging may be performed (operation S290).

Thereafter, in the present disclosure, whether or not the destination is input as requested may be confirmed (operation S240).

In the present disclosure, when the destination is not input within a predetermined time, general charging may be performed (operation S290).

Thereafter, in the preset present disclosure, when the destination is input, a gain charging amount in an uphill or downhill section between the current position of the vehicle and the destination may be calculated (operation S250).

Here, in the present disclosure, the uphill or downhill section between the current position and the destination may be extracted, and the gain charging amount may be calculated based on an altitude and slope of the extracted uphill section or downhill section.

As one example, in the present disclosure, when the gain charging amount in the uphill section is calculated, the gain charging amount in the uphill section may be calculated by calculating a non-consumption amount of the SOC due to starting of the engine caused by transition of the vehicle to the HEV mode.

As another example, when the gain charging amount in the downhill section is calculated, the gain charging amount in the downhill section may be calculated by calculating an expected average vehicle speed corresponding to the altitude and slope of the downhill section and an amount of energy generated due to regenerative braking thereby.

Thereafter, in the present disclosure, an optimum charging setting value may be calculated by correcting the driver's desired charging setting value based on the gain charging amount (operation S260).

Here, in the present disclosure, the optimum charging setting value may be calculated using an equation of Optimum charging Setting Value=Driver's Desired Charging Setting Value−Gain Charging Amount in Uphill or Downhill Section.

Thereafter, in the present disclosure, a final target charging amount may be calculated based on the optimum charging setting value and a current residual charging amount (operation S270), and optimum charging may be performed based on the final target charging amount (operation S280).

Here, in the present disclosure, the final target charging amount may be calculated using an equation of Final Target Charging Amount=Optimum charging Setting Value−Current Residual Charging Amount.

In some cases, in the present disclosure, when the optimum charging setting value is calculated, whether or not application of the optimum charging setting value is requested may be confirmed, the final target charging amount may be calculated by applying the optimum charging setting value upon confirming that application of the optimum charging setting value is requested, and charging of the battery may be controlled so that optimum charging of the battery may be performed based on the final target charging amount.

Further, in some cases, in the present disclosure, upon confirming that application of the optimum charging setting value is requested, the charging setting value which is stored may be updated with the optimum charging setting value.

Thereafter, when application of the optimum charging setting value is refused, general charging may be performed (operation S290).

Thereafter, in the present disclosure, whether or not an SOC of the battery is a discharged state may be confirmed (operation S300).

Thereafter, upon confirming that the SOC of the battery is the discharged state, whether or not the SOC is less than a charging alarm display reference value may be confirmed (operation S310).

Thereafter, when the SOC is less than the charging alarm display reference value, a gain charging amount in an uphill or downhill section between the current position of the vehicle and the destination may be calculated (operation S320).

Here, in the present disclosure, the uphill or downhill section between the current position and the destination may be extracted, and the gain charging amount may be calculated based on an altitude and slope of the extracted uphill section or downhill section.

As one example, in the present disclosure, when the gain charging amount in the uphill section is calculated, the gain charging amount in the uphill section may be calculated by calculating a non-consumption amount of the SOC due to starting of the engine caused by transition of the vehicle to the HEV mode.

As another example, when the gain charging amount in the downhill section is calculated, the gain charging amount in the downhill section may be calculated by calculating an expected average vehicle speed corresponding to the altitude and slope of the downhill section and an amount of energy generated due to regenerative braking thereby.

Further, in the present disclosure, when the SOC is the charging alarm display reference value or more, the charging alarm lamp may not be turned on (operation S360).

Thereafter, in the present disclosure, a corrected SOC may be calculated based on the gain charging amount (operation S330).

Here, in the present disclosure, the corrected SOC may be calculated using an equation of Corrected SOC=SOC−Gain Charging Amount in Uphill or Downhill section.

Thereafter, whether or not the corrected SOC is less than the charging alarm display reference value may be confirmed (operation S340).

Here, in the present disclosure, when the corrected SOC is the charging alarm display reference value or more, the charging alarm lamp may not be turned on (operation S360).

Further, in the present disclosure, when the corrected SOC is less than the charging alarm display reference value, the charging alarm lamp may be turned on (operation S350).

In this way, in the present disclosure, the optimum charging amount of the battery may be set in consideration of a predetermined route, i.e., uphill or downhill driving, and thus energy conservation and improvement in functions of the vehicle may be achieved.

Further, in the present disclosure, an optimum point in time when the charging alarm is displayed may be set in consideration of the predetermined route, i.e., uphill or downhill driving, and thus, marketability of the vehicle may be improved.

A process provided by the method for controlling optimization of the charging amount of the battery in the apparatus for controlling optimization of the charging amount of the battery of the vehicle charged with external power in accordance with one form of the present disclosure may be executed through a computer readable recording medium in which a program for executing the method for controlling optimization of the charging amount of the battery in the apparatus in accordance with one form of the present disclosure.

The above-described method in accordance with one form of the present disclosure may be implemented as computer readable code in computer readable recording medium in which programs are recorded. Such computer readable recording media may include all kinds of recording media in which data readable by computer systems is stored. For example, the computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, an apparatus and method for controlling optimization of a charging amount of a battery of a vehicle charged with external power in accordance with at least one form of the present disclosure may set an optimum charging amount of the battery and an optimum charging alarm by predicting topography of a driving path, such as an uphill or downhill driving section.

That is, in the present disclosure, the optimum charging amount of the battery may be set in consideration of a predetermined route, i.e., uphill or downhill driving, and thus, energy conservation and improvement in functions of the vehicle may be achieved.

Further, in the present disclosure, an optimum point in time when the charging alarm is displayed may be set in consideration of the predetermined route, i.e., uphill or downhill driving, and thus, marketability of the vehicle may be improved.

It will be apparent to those skilled in the art that various modifications and variations can be made in the present disclosure without departing from the spirit or scope of the present disclosure. Thus, it is intended that the present disclosure cover the modifications and variations of this present disclosure provided they come within the scope of the appended claims and their equivalents.

What is claimed is:

1. An apparatus for controlling optimization of a charging amount of a battery of a vehicle charged with external power, the apparatus comprising:
   a map storage configured to store altitude information of topography;
   a position detector configured to detect a current position of the vehicle; and
   a controller configured to:
   control the map storage and the position detector,
   acquire the current position of the vehicle from the position detector when a desired charging setting value is input,
   confirm whether or not the current position of the vehicle is located in a high-altitude area based on the current position of the vehicle and perform general charging of the battery when the current position of the vehicle is not located in the high-altitude area,
   request input of a destination when the current position of the vehicle is located in the high-altitude area,
   confirm whether or not the destination is input as requested,
   acquire altitude information of topography corresponding to a total driving path between the current position of the vehicle and a destination when the destination is input,
   calculate a gain charging amount in an uphill or downhill section on the driving path based on the altitude information,
   calculate an optimum charging setting value based on the desired charging setting value and the calculated gain charging amount, calculate a final target charging amount based on the optimum charging setting value and a current residual charging amount, and control charging of the battery so as to perform optimum charging of the battery.

2. The apparatus according to claim 1, wherein, when the controller calculates the gain charging amount, the controller is configured to:

extract the uphill or downhill section on the driving path based on the altitude information, and calculate the gain charging amount based on an altitude and slope of the extracted uphill or downhill section.

3. The apparatus according to claim 2, wherein, when the controller calculates the gain charging amount in the uphill section, the controller is configured to:

calculate the gain charging amount in the uphill section by calculating a non-consumption amount of a state of charge (SOC) of the battery due to starting of an engine caused by transition of the vehicle to a hybrid electric vehicle (HEV) mode in the uphill section.

4. The apparatus according to claim 2, wherein, when the controller calculates the gain charging amount in the downhill section, the controller is configured to:

calculate the gain charging amount in the downhill section by calculating an amount of energy generated due to regenerative braking corresponding to the altitude and slope of the downhill section.

5. The apparatus according to claim 1, wherein, when the controller calculates the optimum charging setting value, the controller is configured to calculate the optimum charging setting value using an equation:

Optimum charging Setting Value=Driver's Desired Charging Setting Value−Gain Charging Amount in Uphill or Downhill section.

6. The apparatus according to claim 1, wherein, when the controller calculates the final target charging amount, the controller is configured to calculate the final target charging amount using an equation:

Final Target Charging Amount=Optimum charging Setting Value−Current Residual Charging Amount.

7. The apparatus according to claim 1, wherein the controller is configured to:

determine whether or not a state of charge (SOC) of the battery is less than a charging alarm display reference value when the SOC is a discharged state, calculate the gain charging amount in the uphill or downhill section between the current position of the vehicle and the destination when the SOC is less than the charging alarm display reference value, calculate a corrected SOC based on the gain charging amount, confirm whether or not the corrected SOC is less than the charging alarm display reference value, and turn on a charging alarm lamp when the corrected SOC is less than the charging alarm display reference value.

8. The apparatus according to claim 7, wherein, when the controller confirms whether or not the corrected SOC is less than the charging alarm display reference value, the controller does not turn on the charging alarm lamp when the corrected SOC is the charging alarm display reference value or more.

9. The apparatus according to claim 7, wherein, when the controller calculates the gain charging amount, the controller is configured to:

extract the uphill or downhill section on the driving path based on the altitude information, and calculate the gain charging amount based on an altitude and slope of the extracted uphill or downhill section.

10. The apparatus according to claim 9, wherein, when the controller calculates the gain charging amount in the uphill section, the controller is configured to calculate the gain charging amount in the uphill section by calculating a non-consumption amount of a state of charge (SOC) of the battery due to starting of an engine caused by transition of the vehicle to a hybrid electric vehicle (HEV) mode in the uphill section.

11. The apparatus according to claim 9, wherein, when the controller calculates the gain charging amount in the downhill section, the controller is configured to calculate the gain charging amount in the downhill section by calculating an amount of energy generated due to regenerative braking corresponding to the altitude and slope of the downhill section.

12. The apparatus according to claim 7, wherein, when the controller calculates the corrected SOC, the controller is configured to calculate the corrected SOC using an equation:

Corrected SOC=SOC−Gain Charging Amount in Uphill or Downhill section.

13. The apparatus according to claim 7, wherein, when the controller confirms whether or not the corrected SOC is less than the charging alarm display reference value, the controller does not turn on the charging alarm lamp when the corrected SOC is the charging alarm display reference value or more.

14. A method for controlling optimization of a charging amount of a battery in an apparatus for controlling optimization of the charging amount of the battery of a vehicle charged with external power, the apparatus having a controller configured to control a position detector, the method comprising:

acquiring, by the controller, a current position of the vehicle when a desired charging setting value is input;

confirming, by the controller, whether or not the current position of the vehicle is located in a high-altitude area based on the current position of the vehicle and performing general charging of the battery when the current position of the vehicle is not located in the high-altitude area;

requesting, by the controller, input of a destination when the current position of the vehicle is located in the high-altitude area;

confirming, by the controller, whether or not the destination is input as requested;

acquiring, by the controller, altitude information of topography corresponding to a total driving path between the current position of the vehicle and the destination when the destination is input;

calculating, by the controller, a gain charging amount in an uphill or downhill section between the current position of the vehicle and the destination based on the altitude information;

calculating, by the controller, an optimum charging setting value based on the desired charging setting value and the gain charging amount;

calculating, by the controller, a final target charging amount based on the optimum charging setting value and a current residual charging amount; and controlling, by the controller, charging of the battery so as to perform optimum charging of the battery based on the final target charging amount.

15. The method according to claim 14, wherein, in calculating the gain charging amount, the controller extracts the uphill or downhill section on the driving path based on the altitude information, and calculates the gain charging amount based on an altitude and slope of the extracted uphill or downhill section.

16. The method according to claim 14, wherein, in calculating the optimum charging setting value, the controller calculates the optimum charging setting value using an equation:

Optimum charging Setting Value=Driver's Desired Charging Setting Value−Gain Charging Amount in Uphill or Downhill section.

17. The method according to claim 14, wherein, in calculating the final target charging amount, the controller calculates the final target charging amount using an equation:

Final Target Charging Amount=Optimum charging Setting Value−Current Residual Charging Amount.

18. The method according to claim 14, further comprising, after controlling the charging of the battery:
confirming, by the controller, whether or not a state of charge (SOC) of the battery is less than a charging alarm display reference value when the SOC is a discharged state;
calculating, by the controller, a gain charging amount in the uphill or downhill section between the current position of the vehicle and the destination when the SOC is less than the charging alarm display reference value;
calculating, by the controller, a corrected SOC based on the gain charging amount;
confirming, by the controller, whether or not the corrected SOC is less than the charging alarm display reference value; and
turning on, by the controller, a charging alarm lamp when the corrected SOC is less than the charging alarm display reference value.

19. The method according to claim 18, wherein, in calculating the gain charging amount, the controller extracts the uphill or downhill section on the driving path based on the altitude information, and calculates the gain charging amount based on an altitude and slope of the extracted uphill or downhill section.

20. The method according to claim 18, wherein, in calculating the corrected SOC, the controller calculates the corrected SOC using an equation:

Corrected SOC=SOC−Gain Charging Amount in Uphill or Downhill section.

* * * * *